United States Patent

Chung

[11] Patent Number: 5,812,074
[45] Date of Patent: Sep. 22, 1998

[54] HIGH SPEED DATA SYNTAX PARSING APPARATUS

[75] Inventor: Hong-Kyu Chung, Seoul, Rep. of Korea

[73] Assignee: Samsung Electronics Co., Ltd., Kyungki-Do, Rep. of Korea

[21] Appl. No.: 795,244

[22] Filed: Feb. 10, 1997

[30] Foreign Application Priority Data

Feb. 8, 1996 [KR] Rep. of Korea ................... 1996-3017

[51] Int. Cl.⁶ .................................................. H03M 7/40
[52] U.S. Cl. ............................ 341/67; 341/61; 341/50; 341/95; 341/106
[58] Field of Search ............................ 341/67, 61, 50, 341/95, 106

[56] References Cited

U.S. PATENT DOCUMENTS 5,566,089  10/1996  Hoogenboom ...................... 364/514 A

*Primary Examiner*—Jeffrey A. Gaffin
*Assistant Examiner*—Jason L. W. Kost
*Attorney, Agent, or Firm*—Sughrue, Mion, Zinn, Macpeak & Seas, PLLC

[57] ABSTRACT

A syntax parsing apparatus produces an effective bit length used in a video decoder which decodes encoded bitstream data. The syntax parsing apparatus includes an input port for receiving encoded bitstream data, and a control command output port for storing data of a plurality of control commands and sequentially selects and outputs the data of each of the plurality of the control commands. A variable-length code table unit selects and outputs either the bitstream data received via the input port or a variable-length code corresponding to the received bitstream data according to the control command data supplied from the control command output port, and outputs a variable-length code length corresponding to the received bitstream data. A data store stores the selected data output from the variable-length code table unit in response to the control command data. A condition signal generator generates a condition signal representing whether the bitstream data received via the input port is additional information, using the selected data stored in the data store and the bitstream data received via the input port. An effective length output portion receives the selected data stored in the data store and the variable-length code length output from the variable-length code table unit, determines an effective bit length corresponding to next bitstream data to be received via the input port, according to the determined control command data and the condition signal, and outputs the determined result.

12 Claims, 8 Drawing Sheets

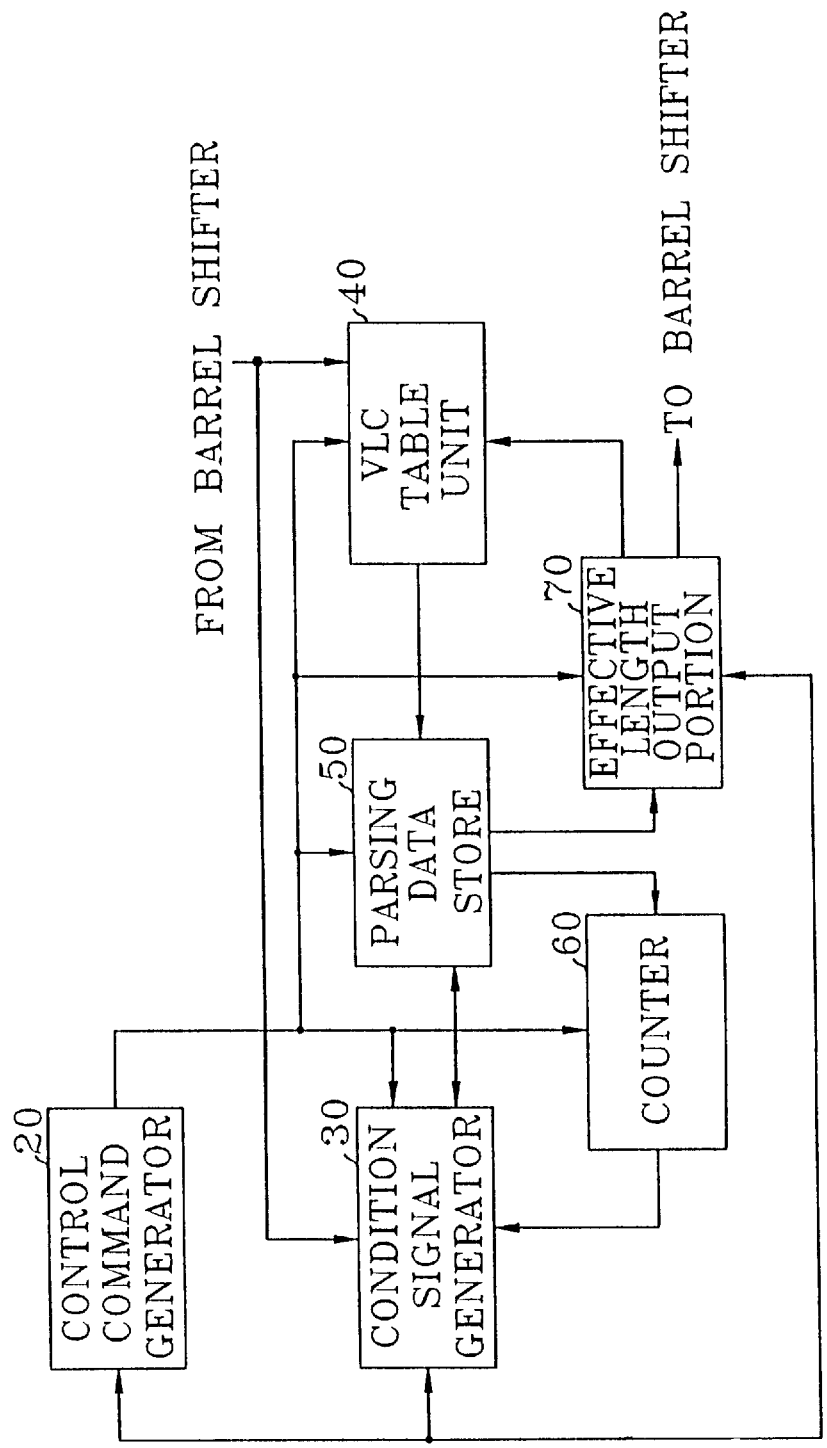

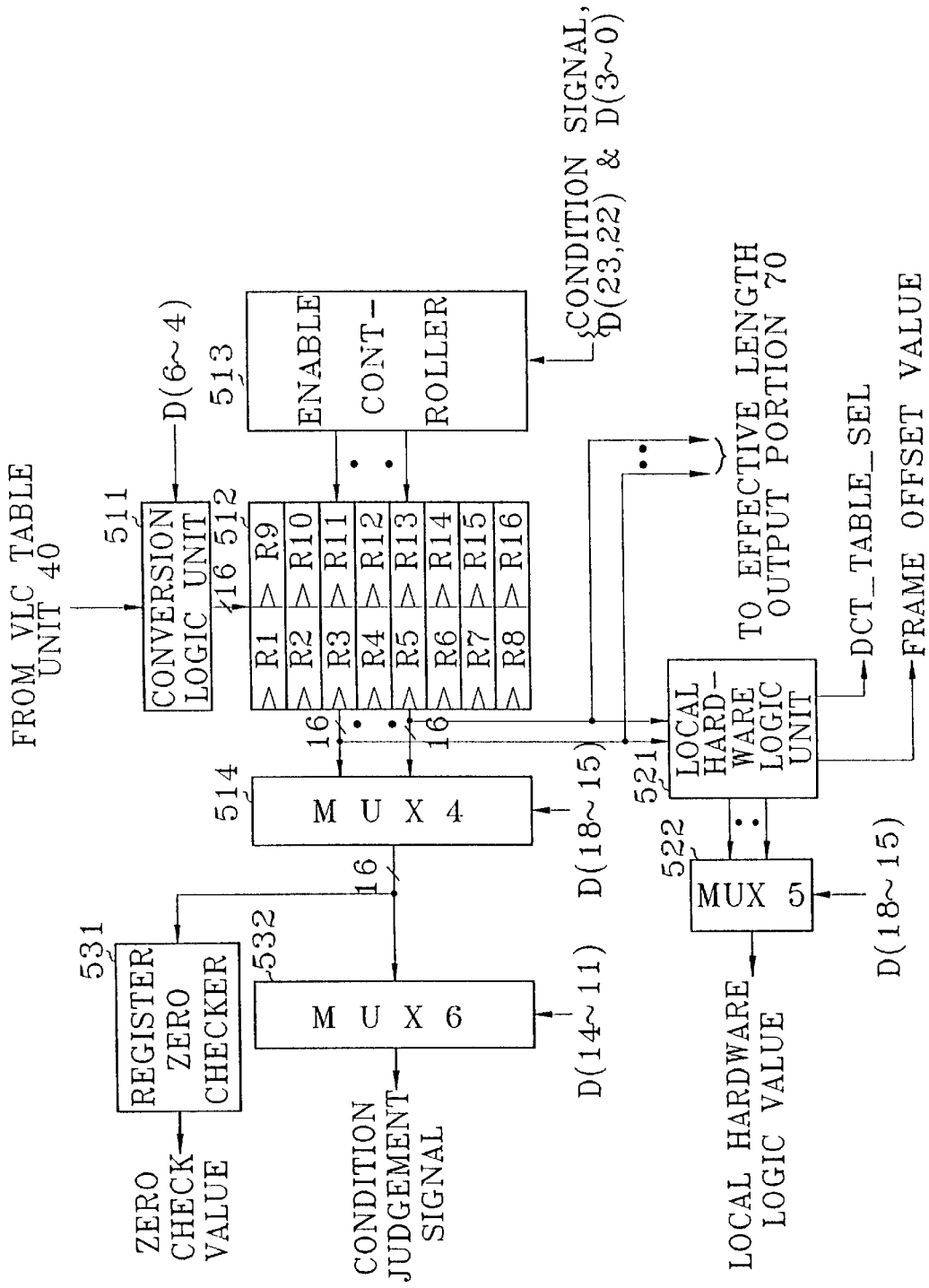

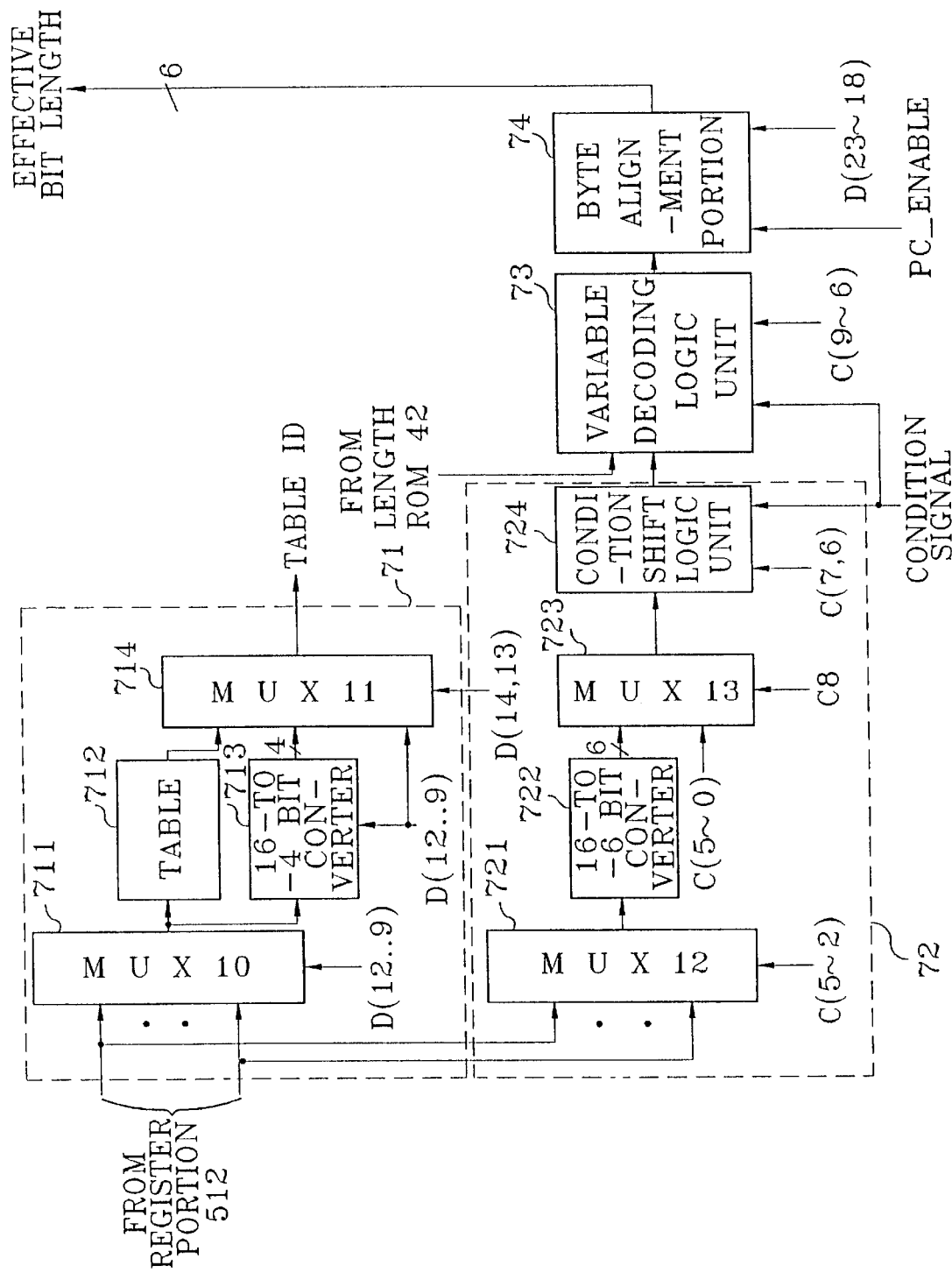

ately for the HDTV standard.
HIGH SPEED DATA SYNTAX PARSING APPARATUS

BACKGROUND OF THE INVENTION

The present invention relates to a syntax parsing apparatus for encoded data in a video decoder, and more particularly, to a high speed data syntax parsing apparatus which parses a syntax of a bitstream encoded according to the HDTV standard presented in the MPEG2 (Moving Picture Experts Group 2) and which determines an effective bit length for decoding.

A video decoder uses a syntax parsing apparatus to decode an input bitstream according to a syntax specified in the standard of encoded data. The syntax parsing apparatus determines an effective bit length of input bitstream data based on a syntax of the bitstream specified in the encoded data standard. Thus, the video decoder can decode the input bitstream data.

At present, there exists a standard (MPEG2) which is a video decoder standard for HDTV (high-definition television), and a video decoder appropriate for the MPEG2 standard is under development. The MPEG2 standard, which is a main profile and a high level, is one of twenty standards defined by five profiles and four levels.

Generally, a finite state machine (FSM) method and a micro-control method are widely used methods for designing a syntax parsing circuit. The FSM method, which performs its function using hard-wired logic, can enhance a syntax parsing speed by yielding an optimized design. However, the FSM method has difficulties related to debugging. In the FSM method, it is also difficult to add a new function or to change the function.

The micro-control method employs software, and the syntax parsing circuit of this method includes a ROM for storing a control code and a microcontroller for controlling the ROM. The microcontroller has the minimum function necessary for parsing a syntax and performs a reading operation of a syntax parsing sequence every clock of the ROM. The syntax parsing sequence is constituted by a microcode containing an instruction and a program. The micro-control method is easily implemented, easily performs a debugging operation and comparatively easily adds a new function when compared with those of the FSM method.

FIG. 1 shows a general syntax parsing circuit capable of employing the above-described FSM method or the micro-control method. The FIG. 1 circuit performs a syntax parsing control with respect to a bitstream encoded according to the HDTV standard presented in the MPEG2 standard. A syntax parser 11 receives a bitstream at an N-bit ratio per clock and holds a syntax parsing operation according to a hold signal input from an external source (not shown). The syntax parser 11 parses the syntax of the input bitstream in units of N bits and determines an effective bit length of the input bitstream appropriate for the current syntax. For example, if uppermost M bits among the N bits of the input bitstream data are parsed to be appropriate for the current syntax, the syntax parser 11 outputs a signal representing that the uppermost M bits are effective bits. A register 12 stores parameters affecting the next syntax parsing among the parameters obtained from the result of the current parsing. The syntax parser 11 uses the parameters stored in the register 12 when performing the syntax parsing. A comparator 13 compares the parameters applied from the syntax parser 11 and the register 12 with a predetermined comparative value based on a syntax defined by a corresponding standard, and supplies the comparison result to the syntax parser 11 and the register 12.

However, the above conventional syntax parsing control circuit requires a fast operating frequency if it is to operate according to the HDTV standard presented in the MPEG2 standard.

SUMMARY OF THE INVENTION

To solve the above problem, it is an object of the present invention to provide a high speed data syntax parsing apparatus capable of parsing a syntax with respect to a bitstream which has been encoded at high speeds appropriate for the HDTV standard.

To accomplish the above object of the present invention, there is provided a syntax parsing apparatus for a video decoder which decodes encoded bitstream data according to an effective bit length, the syntax parsing apparatus comprising: an input port for receiving encoded bitstream data; control command output means for storing data of a plurality of control commands and sequentially selecting and outputting the data of each of the plurality of the control commands; variable-length code table means for selecting and outputting one of the bitstream data received via the input port and a variable-length code corresponding to the received bitstream data according to the control command data supplied from the control command output means, and outputting a variable-length code length corresponding to the received bitstream data; data store means for storing the selected data output from the variable-length code table means in response to the control command data; condition signal generation means for generating a condition signal representing whether the bitstream data received via the input port is additional information, using the selected data stored in the data store means and the bitstream data received via the input port; and effective length output means for receiving the selected data stored in the data store means and the variable-length code length output from the variable-length code table means, determining an effective bit length corresponding to next bitstream data to be received via the input port, according to the determined control command data and the condition signal, and outputting the determined result.

BRIEF DESCRIPTION OF THE DRAWINGS

The preferred embodiments are described with reference to the drawings wherein:

FIG. 2 is a block diagram showing a high speed data syntax parsing circuit according to a preferred embodiment of the present invention.

FIGS. 3A through 3F are detailed block diagrams of the respective elements of FIG. 2.

DETAILED DESCRIPTION OF THE EMBODIMENT OF THE INVENTION

Figure 1:
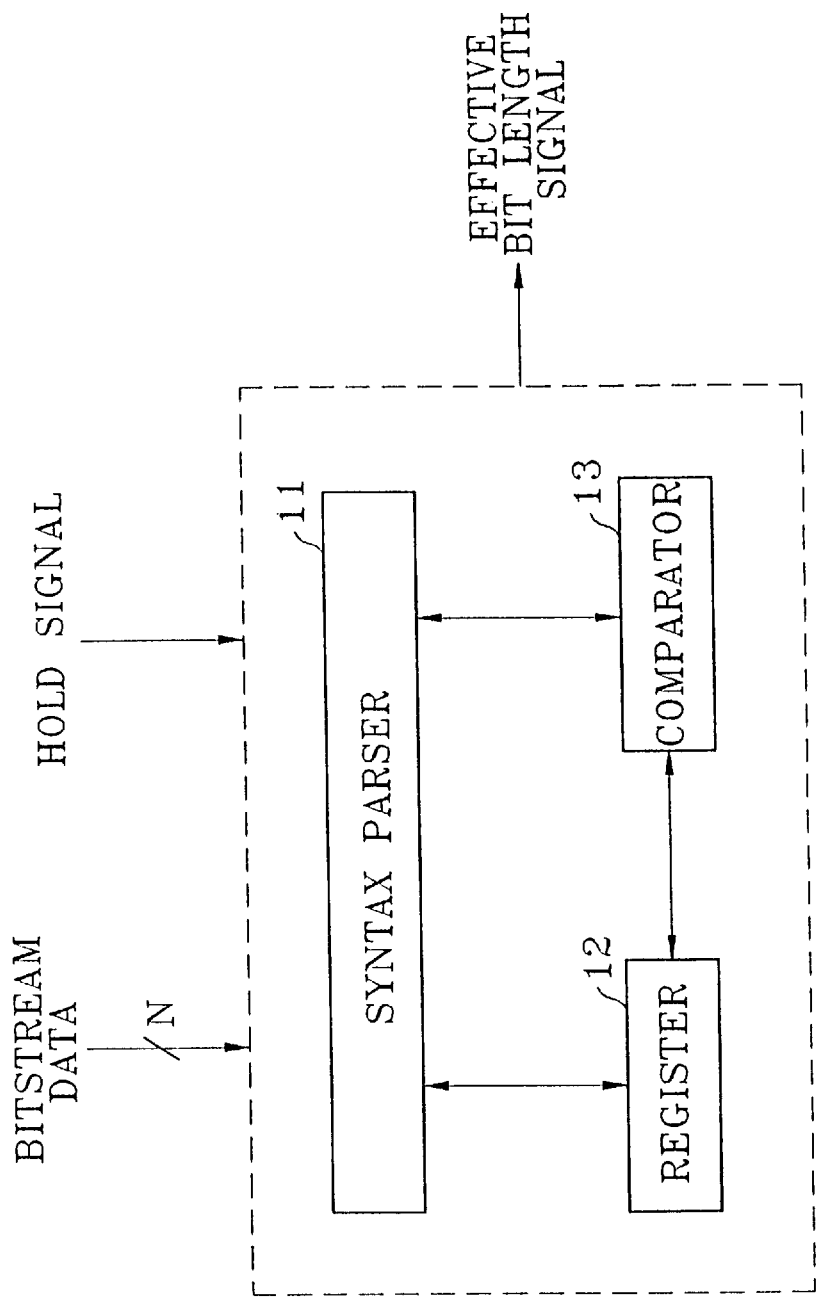
FIG. 1 shows a general syntax parsing circuit.

A preferred embodiment of the present invention will be described in detail with reference to the accompanying drawings.

The circuit of FIG. 2 parses a syntax of an encoded bitstream. A control command generator 20 stores control commands for parsing a syntax of a bitstream specified in the MPEG2 standard, and outputs control commands matching a syntax of a currently received bitstream. The control commands are supplied to a condition signal generator 30, a variable-length code table unit 40, a parsing data store 50, a counter 60 and an effective length output portion 70. The condition signal generator 30 generates a condition signal using an N-bit (for example 32-bit) data supplied from a barrel shifter (not shown) storing an encoded video bitstream according to the MPEG2 standard, the control commands applied from the control command generator 20, and the output data of the parsing data store 50 and the counter 60. The condition signal is used for selection of the control commands output from the control command generator 20. The variable-length code table unit 40 receives the N-bit data supplied from the barrel shifter and determines a variable-length code (VLC) and a VLC length from the N-bit data based on the output data of the effective length output portion 70, and selects one of the received N-bit data and the VLC according to a control command of the control command generator 20 and outputs the selected result. The parsing data store 50 receives the output data of the VLC code table unit 40 and stores and outputs data necessary for parsing the next syntax among the received data according to the control command of the control command generator 20. The counter 60 receives the control command and the output data of the parsing data store 50 and performs a count operation of predetermined bits using the received data and a predetermined data. The effective length output portion 70 receives the control command, the condition signal and the output data of the parsing data store 50, determines an effective bit length and outputs the determined result to the barrel shifter.

Figure 3A:
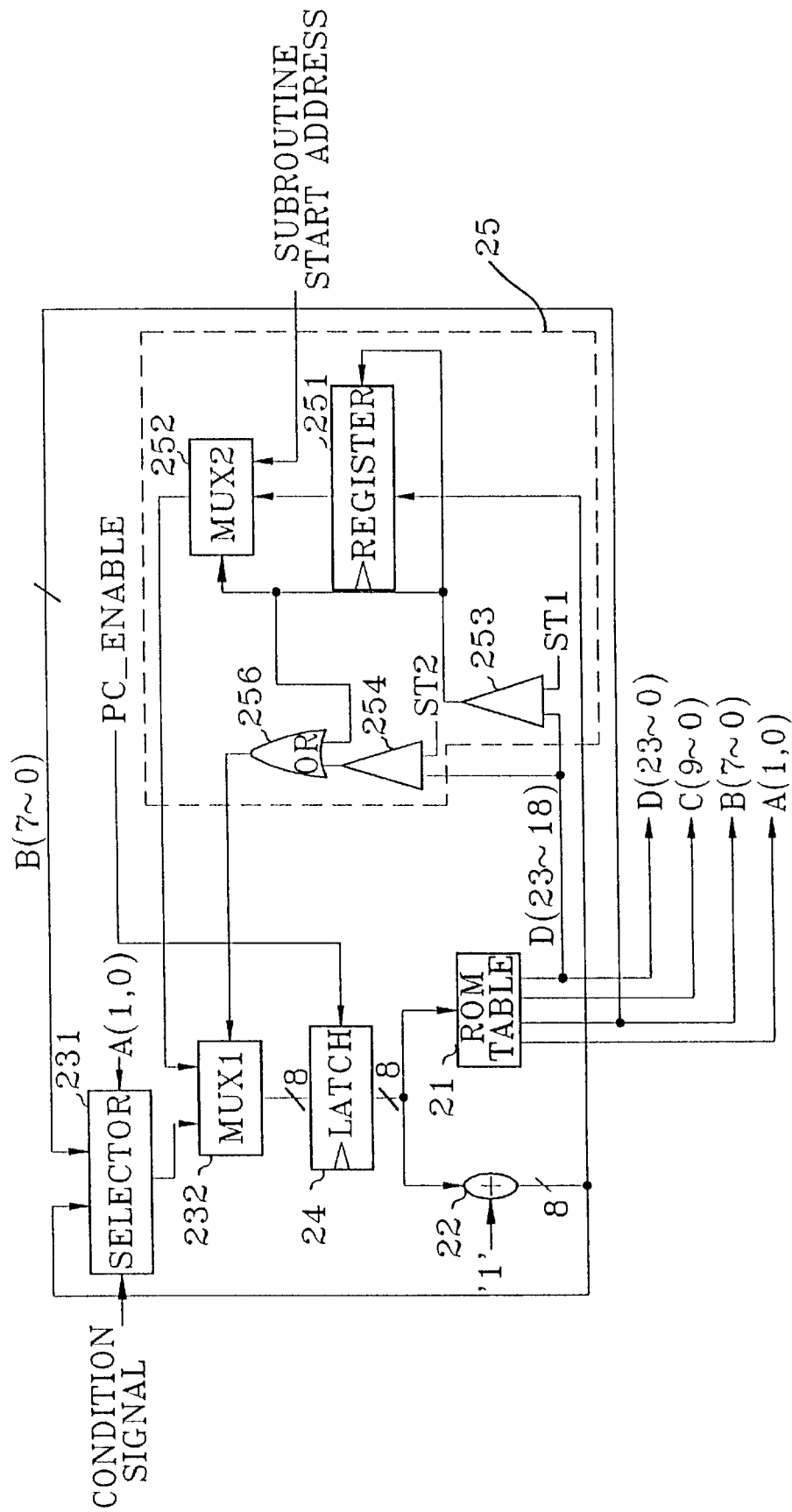

FIG. 3A is a detailed block diagram of the control command generator 20. In FIG. 3A, a ROM table 21 stores the control commands for syntax-parsing the bitstream specified in the above-described standard. The control command data output from the ROM table unit 21 has a total of 44 bits, and is composed of four control commands represented by characters "A" through "D". A control command represented by A(1,0) is the uppermost 2 bits among the 44-bit control command data, which is an increase/jump designation command for designating whether to increase or jump the address of the ROM table unit 21 by one. The control command B (7~0) which is composed of 8 bits following the uppermost 2-bit control command A(1,0) represents a jump address and has the number of program lines, 256 at the maximum. 10-bit control command C(9~0) which follows the control command B(7~0), is for shift discrimination, and the remaining 24-bit control command D(23~0) is for controlling functions such as selection, comparison and storing.

A latch 24 is enabled by an enable signal PC_ENABLE applied from an external source (not shown). When the enable signal is "1", the latch 24 performs a latching operation of an address input from a first multiplexer 232. The latched address is supplied to the ROM table unit 21 and an adder 22. When the enable signal is "0", the latch 24 does not operate. As a result, the FIG. 2 circuit outputs an effective bit length as "0" which makes a syntax parsing operation disabled.

Since an operation for searching a next start code of the same layer according to a syntax structure frequently occurs, it is required to perform an output operation of control commands for a syntax parsing with respect to the next start code of the same layer via a subroutine. Thus, the control commands for performing the subroutine are stored in a separate position of the ROM table unit 21. As a result, the ROM table unit 21 can efficiently store the control commands for a syntax parsing, and can therefore have a small storage capacity. The ROM table unit 21 outputs the control commands which are designated by the 8-bit address data output from the latch 24. The adder 22 increases the address output from the latch 24 by "1" and the increased address is supplied to a selector 231.

The selector 231 receives the increased address output from the adder 22 and the control command B(7~0) applied from the ROM table unit 21, and selects one of the increased address output from the adder 22 and the control command B(7~0) according to the control command A(1,0) and a condition signal applied from the condition signal generator 30. In more detail, if the control command A(1,0) output from the ROM table unit 21 is "00" the selector 231 selects the increased address input from the adder 22. If the control command A(1,0) is "01" the selector 231 selects the control command B(7~0) output from the ROM table unit 21 irrespective of the condition signal applied from the condition signal generator 30. If the control command A(1,0) is "10" the selector 231 selects the control command B(7~0), that is, one of the jump address and the increased address according to the condition signal applied from the condition signal generator 30. If a value of the condition signal is "1" the jump address is selected while if the former is "0" the increased address is selected. If the control command A(1,0) is "11", the selector 231 selects the jump address when the condition signal is "0" and selects the increased address when the condition signal is "1". The address selected by the selector 231 is input to the first multiplexer 232.

The first multiplexer 232 receives the output data of a second multiplexer 252 of a subroutine processor 25 and the address output from the selector 231, and selects and outputs one of the received data according to the output of an OR gate 256. The address output from the first multiplexer 232 is latched by the latch 24 during a one-clock period and is used as an address of the ROM table unit 21 for outputting a control command at the next operating clock.

The subroutine processor 25 includes a register 251 for storing the output data of the adder 22. The data stored in the register 251 is used as a return address for returning after performing a subroutine. The second multiplexer 252 selects one of an external subroutine start address and the output of the register 251 according to the output of a comparator 253 and outputs the selected result. Here, the subroutine start address has a fixed value and is used as an address calling a subroutine for searching a next start code of the ROM table unit 21. Comparators 253 and 254 receive the control command bits D(23~18) output from the ROM table unit 21, and compare the control command bits D(23~18) with predetermined search step values ST1 and ST2, respectively. If the control command bits D(23,22) is "01", the comparator 253 controls the register 251 so that the register 251 stores the increased address output from the adder 22. If the control command bits D(23,22) is "00" and the control command bits D(21,20) is "01", the second multiplexer 252 selects the external subroutine start address and outputs the selected result. In this case, the first multiplexer 232 selects the output of the second multiplexer 252 according to the output of the OR gate 256 which logically sums the outputs of the comparators 253 and 254, and the selected data is input to the latch 24. As a result, the ROM table unit 21 starts the output of the control command designated by the subroutine start address to enable a syntax parsing operation using a subroutine to start. In this case, the output data is also used as an address of the ROM table unit 21. If the control command bits D(23,22) and D(21,20) are "00" and "11", respectively, during the time when the syntax parsing operation is performed using a subroutine, the return address stored in the register 251 is supplied to the latch 24 via the multiplexers 252 and 232. In this case, the ROM table unit 21 outputs the control commands corresponding to the input return address.

Figure 3B:
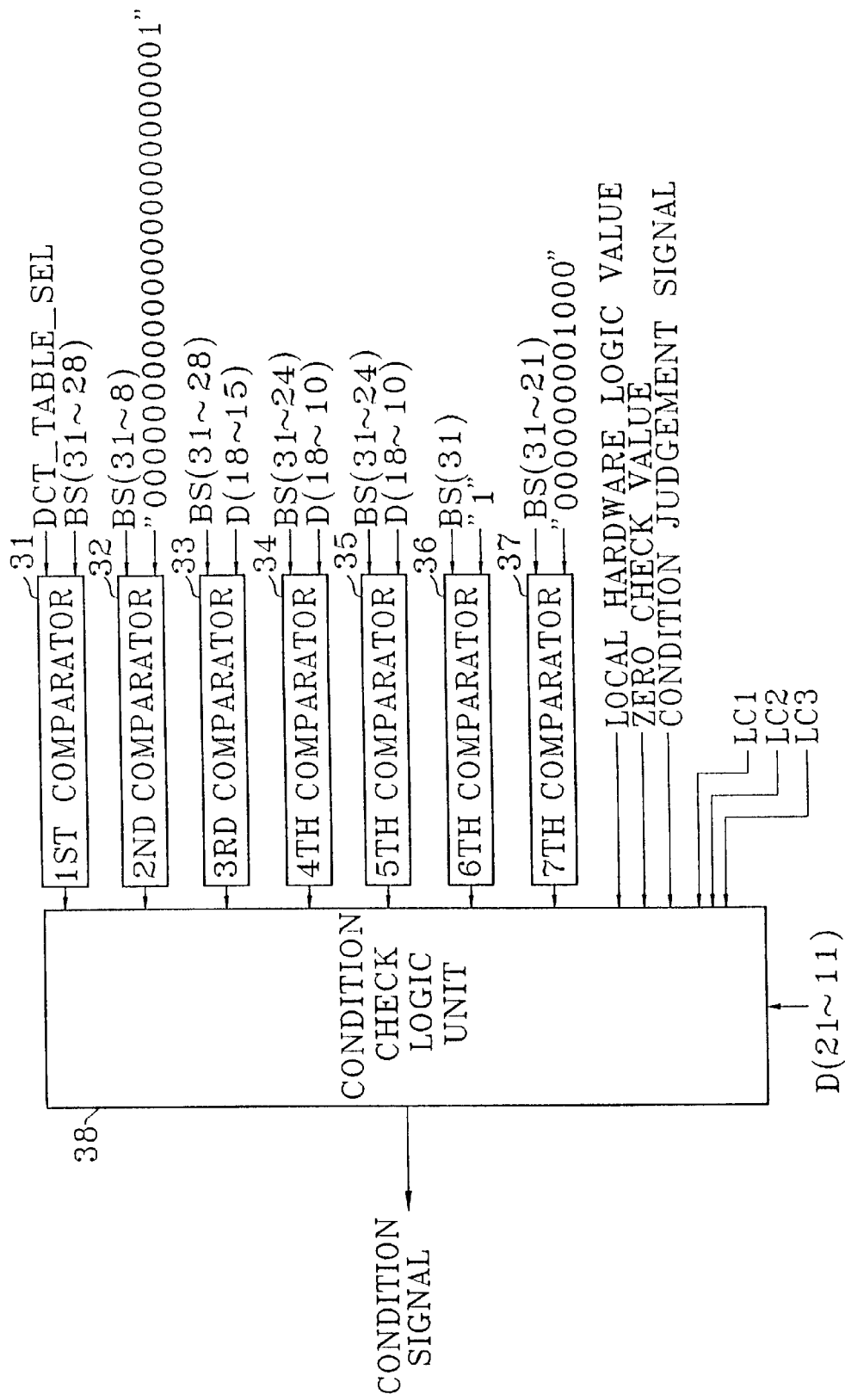

FIG. 3B shows a part of the condition signal generator 30. The condition signal generator 30 is designed into a combinational circuit and performs generation of a condition signal with respect to the 32-bit bitstream data BS(31~0) input from the barrel shifter. The condition signal generator 30 includes a plurality of comparators 31–37 which perform comparison operations with respect to the input bitstream data BS(31~0). A first comparator 31 selects one of the stored EOB code values "10" and "0110" according to the select signal DCT_TABLE_SEL applied from the parsing data store 50. The first comparator 31 judges whether the EOB code is included in the currently input bitstream data, and compares the selected EOB code value with the uppermost 4-bit data BS(31~28) of the bitstream data BS(31~0). The second comparator 32 judges whether a start code representing a start of an optional interval is contained within the 32-bit data, and compares the bits BS(31~8) with predetermined 24-bit string "0000 0000 0000 0000 0000 0001". The third comparator 33 compares the input bits BS(31~28) with the control command bits D(18~15) supplied from the ROM table unit 21. The fourth comparator 34 compares the input bits BS(31~24) with the control command bits D(18~10). Here, the control command bits D(18~15) and D(18~10) have values defined in the bitstream syntax of the MPEG2 standard. The fifth comparator 35 checks whether a slice start code is contained in the BS(31~24) and compares the input bits BS(31~24) with the control command bits D(18~10). The sixth comparator 36 judges a standard of the currently input bitstream and compares the input bit BS(31) with a predetermined value "1". The seventh comparator 37 compares the input bits BS(31~21) with the fixed bit string "0000 0000 1000" and checks whether the ESC code is contained in the Bs(31~21). The comparison results of the first through seventh comparators 31 through 37 are input to a condition check logic unit 38.

The condition check logic unit 38 receives the outputs of the parsing data store 50, the local count values of the counter 60 and the comparison results of the comparators 31–37, and generates a condition signal having a value of "1" if the received data satisfies one of the following conditions (1)–(13) with respect to the control command bits D(21~11).
(1) If "000LCHWxxxx", a local hardware logic value indexed by the LCHW is "1".
(2) If "0011LCxxxxx", a first local count value LC1 indexed by the LC is "0".
(3) If "0011LCxxxxx", a second local count value LC2 is greater than "2" in a case when the LC is "10".
(4) If "0011LCxxxxx", the uppermost bit (MSB) of a third local count value LC3 is "1" in a case when the LC is "11".
(5) If "011REGIabcd", the output bits indexed by 'abcd' of the register indexed by the 'REGI' are all "1".
(6) If "010REGIxxxx", the output bits of the register indexed by the 'REGI' are all "1".
(7) If "1000xxxxxxx", the uppermost bit of the barrel shifter output is "1".
(8) If "1001xxxxxxx", the barrel shifter output is "EOB".
(9) If "1010xxxxxxx", the uppermost 24-bits of the barrel shifter output is 0000$_H$.
(10) If "10110xxxxxx", the uppermost 11-bits of the barrel shifter output is "00000001000".
(11) If "10111xxxxxx", the uppermost 8-bits of the barrel shifter output is a slide start code range.
(12) If "110abcdxxxx", the uppermost 4-bits of the barrel shifter output is 'abcd'.
(13) If "111abcdefgh", the uppermost 8-bits of the barrel shifter output is 'abcdefgh'.

Here, the 11 bits indicated in front of the individual condition represents the control command bits D(21~11). The contents used for the above conditions will be described below with reference to FIGS. 3D through 3F. The condition signal generated in the condition check logic unit 38 indicates whether the data stored in the parsing data store 50 is the encoded data or additional information according to a syntax, and is supplied to the control command generator 20 and the effective length output portion 70.

Figure 3C:
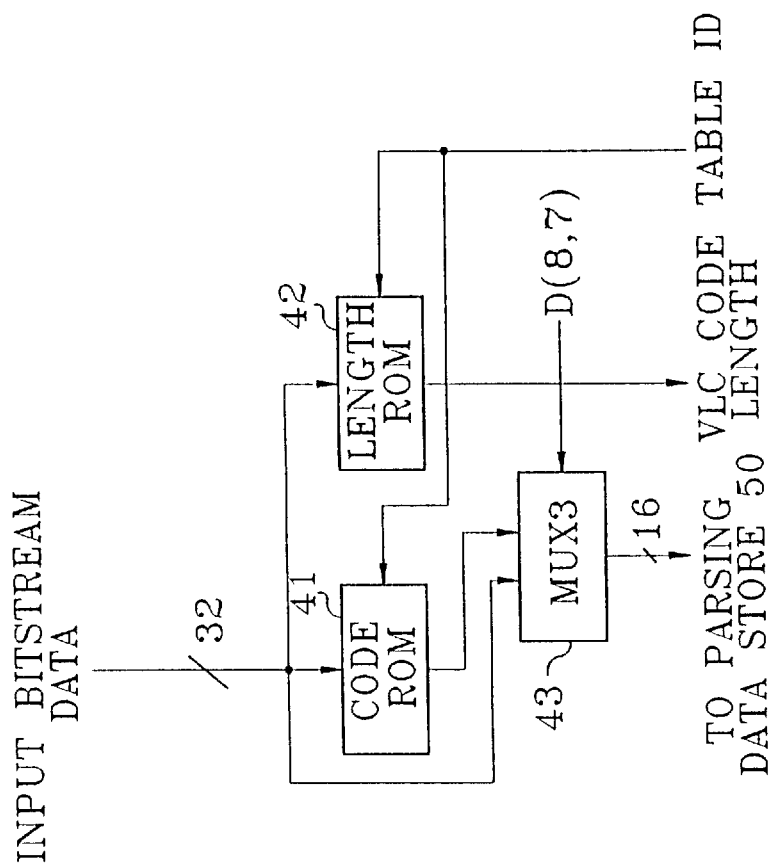

FIG. 3C is a detailed circuit diagram of the VLC table unit 40. The VLC table unit 40 includes two ROMs 41 and 42 respectively for storing the VAL lengths corresponding to the VLCs. The code ROM 41 stores VLC codes of a plurality of VLC tables. The length ROM 42 stores VLC lengths of the plurality of VLC tables. The code ROM 41 and the length ROM 42 select the VLC table matching the input bitstream data among the plurality of VLC tables according to the table identification TABLE ID applied from the effective length output portion 70. If the 32-bit bitstream data is input from the barrel shifter, the code ROM 41 outputs a corresponding VLC code and the length ROM 42 outputs a corresponding VLC length. The VLC length of the length ROM 42 is output to the effective length output portion 70.

A third multiplexer 43 receives the bitstream data output from the barrel shifter and the VLC code output from the code ROM 41. The third multiplexer 43 selects the data to be output according to the control command bits D(8,7) of the control command generator 20 and converts the selected data into a 16-bit size to output the same. If the control command bits D(8,7) is "00", the third multiplexer 43 does not supply any data to the parsing data store 50. If the D(8,7) is "01", the 32-bit bitstream data BS(31~0) is supplied to the parsing data store 50. If the D(8,7) is "11", the VLC code output from the code ROM 41 is supplied to the parsing data store 50.

The parsing data store shown in FIG. 3D includes a conversion logic unit 511 receiving the output data of the VLC table unit 40. The conversion logic unit 511 is a hardware logic circuit and receives the output data of the third multiplexer 43 and the control command bits D(6~4) generated in the control command generator 20. The conversion logic unit 511 converts the output data of the third multiplexer 43 according to a frame motion type or a field motion type represented by the control command bits D(6~4). The converted data is input to a register portion 512.

An enable controller 513 for controlling a storage operation of the register portion 512 receives the control command bit and bits D(23,22) and D(3~0), and the condition signal. The enable controller 513 enables 16 registers R1–R16 constituting the register portion 512, individually. To do this, the enable controller 513 uses the following Table showing the relationship between the control command bits D(23,22) output from the control command generator 20.

TABLE

| D (23,22) | contents |
| --- | --- |
| 00 | not operate |
| 01 | store without condition |
| 10 | store with condition (condition signal="0") |
| 11 | store with condition (condition signal="1") |

Based on the relationship of the Table, the enable controller 513 determines whether the output of the conversion logic unit 511 is stored in the register portion 512, and determines a register in which the data applied from the conversion logic unit 511 is stored according to the control command bits D(3~0). The registers R1–R16 constituting the register portion 512 store the output data of the conversion logic unit 511. The register R1 stores a picture_coding_type. The register R2 stores a picture_structure, a top_field_first, a frame_pred_frame_dct, a concealment_motion_vectors, and a repeat_first_field. The register R3 stores a progressive_sequence. The register R4 stores data such as fcode [0] [0], fcode [0] [1], fcode [1] [0], and fcode[1][0]. The register R5 stores a macroblock_type. The register R6 stores a frame_motion_type or a field_motion_type. The register R7 stores a coded_block_pattern. The register R8 stores a dct_dc_size_luminance. The register R9 stores a dct_dc_size_chrominance. Here, the notations which indicate parameters stored in the registers R1–R9 are defined in the MPEG2 standard in connection with syntax and semantics of the video bitstream, which are used in the present invention as they are. The parameters stored in the registers of the register portion 512 are supplied to a fourth multiplexer 514, a local hardware logic unit 521 and the effective length output portion 70. The fourth multiplexer 514 selects one of the parameters applied from the register portion 512 according to the control command bits D(18~15) of the control command generator 20 and inputs the selected parameter to a register zero checker 531 and a sixth multiplexer 532.

The local hardware unit 521 determines a DCT table unit corresponding to the current input bitstream data based on the parameters applied from the register portion 512, and generates a select signal DCT_TABLE_SEL indicative of the DCT table. The select signal DCT_TABLE_SEL is supplied to the first comparator 31 of FIG. 3B. The local hardware logic unit 521 uses the applied parameters to judge whether a repeat loop is contained in the input bitstream data. If the repeat loop exists, a frame offset value is output to the counter 60. The local hardware logic unit 521 also performs a logic operation with respect to the applied parameters to produce local hardware logic values. The fifth multiplexer 522 receives the local hardware logic values and outputs the local hardware logic value selected by the control command bits D(18~15) output from the control command generator 20 to the condition check logic unit 38 of FIG. 3B.

The register zero checker 531 checks whether the value of the parameter selected by the fourth multiplexer 514 is zero, and outputs a one-bit zero check value representing the result. The zero check value represents whether the output bits of the register indexed by the "REGI" of the above condition (6) are all zeros. The zero check value is supplied to the condition check logic unit 38. The sixth multiplexer 532 uses the 16-bit parameter applied via the fourth multiplexer 514 and the control command bits D(14~11) output from the control command generator 20, to generate a condition judgement signal. In more detail, the sixth multiplexer 532 generates a condition judgement signal representing whether the bits determined by the control command bits D(14~11) among the 16-bit parameters are all "1". The condition judgement signal represents whether the output bits indexed by the "REGI" and "abcd" of the above condition (5) are all "1".

Figure 3E:
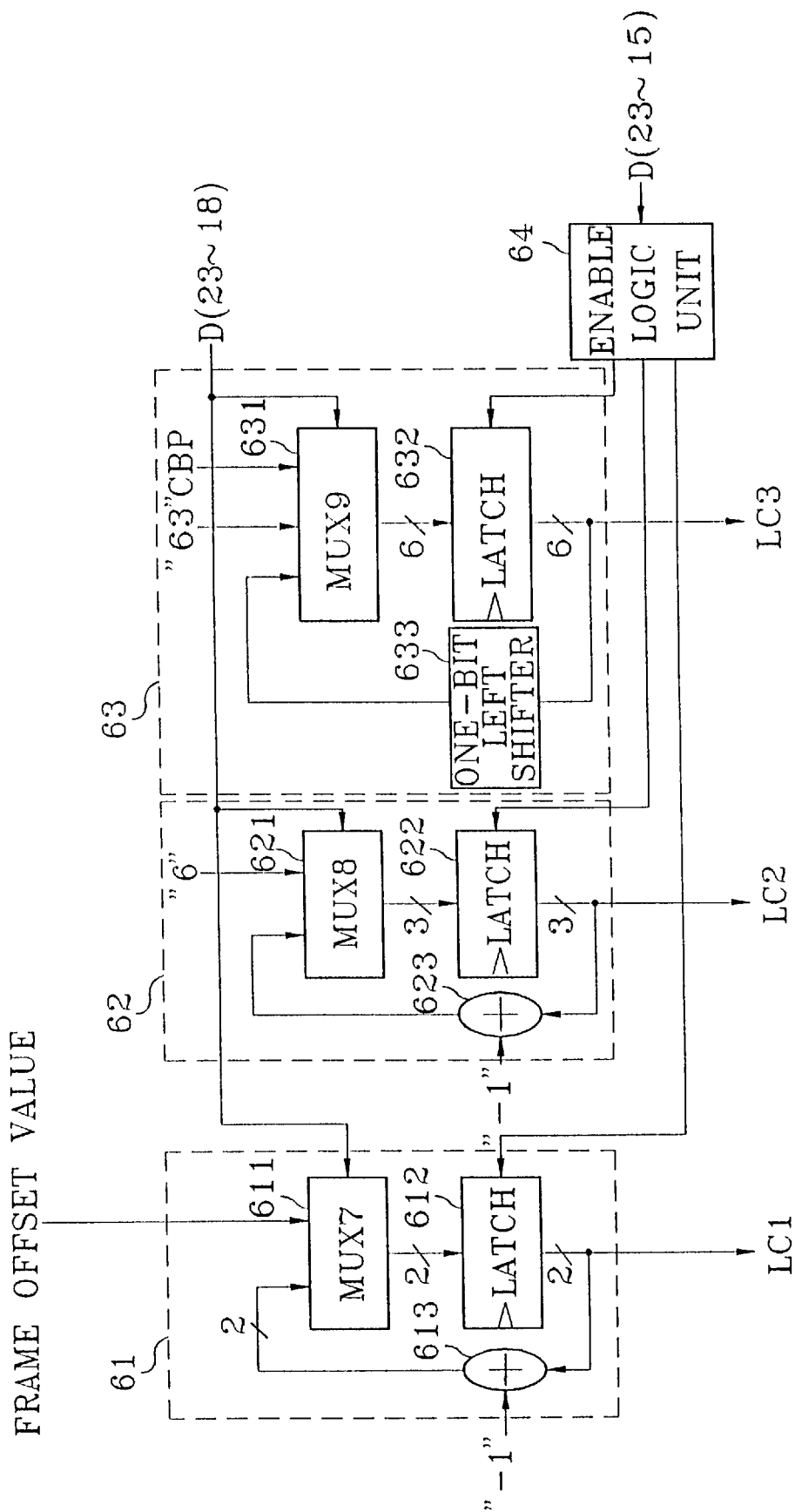

The counter 60 shown in FIG. 3E is for a case when a repeat loop exists in the syntax, because the repeat loop has a layer in which a bitstream is repeated by a syntactic structure. The counter 60 includes a 2-bit counter 61, a 3-bit counter 62, a 6-bit counter 63 and an enable logic unit 64. The enable logic unit 64 generates an enable control signal according to the control command bits D(23~16) of the control command generator 20. Particularly, the enable logic unit 64 controls the count operations of the counters 61~63 according to the D(19~15) in case when the control command bits D(23,22) is "00" and the D(21,20) is "10". Also, if the D(19~15) is "00000" the enable logic unit 64 disables the counters 61~63. The enable control signal is applied to the first through third counters 61~63.

The first counter 61 receives a frame offset value applied from the local hardware logic unit 521. The frame offset value is determined by a progressive_sequence, a repeat_first_field, a top_field_first, and a picture_structure. The seventh multiplexer 611 of the first counter 61 receives the frame offset value and the output data of the adder 613 and selects one of two according to the control command bits D(23~18) of the control command generator 20. The seventh multiplexer 611 selects the value during the time when the frame offset value is applied from the local hardware logic unit 521, and selects the output of the adder 613 if the D(23~18) is "OOO1LCx". The selected signal is applied to the latch 612. The latch 612 stores the data applied from the seventh multiplexer 611 according to the enable control signal of the enable logic unit 64. The data stored in the latch 612 is supplied to the condition check logic unit 38 and the adder 613 as a 2-bit local count value LC1. The adder 613 adds "1" to the input local count value and is fedback to the seventh multiplexer 611.

The second counter 62 repeats a loop six times to process a block, and includes an eighth multiplexer 621 which receives the data applied from the adder 623. The eighth multiplexer 621 selects the output of the adder 623 if the control command bits D(23~18) is "OOO1LCx" and selects a predetermined value of "6" in the other cases. The selected value is applied to the latch 622. The latch 622 latches the signal selected in the eighth multiplexer 621 according to the enable control signal of the enable logic unit 64. The 3-bit local count value LC2 stored in the latch 622 is supplied to the adder 623 and the condition check logic unit 38 of the condition signal generator 30. The adder 623 adds "−1" to the input 3-bit local count value and the output of the adder 623 is fedback to the eighth multiplexer 621.

The third counter 63 shifts 64-times repeat loop or the coded block pattern (CBP) by one bit to the left, and includes a ninth multiplexer 631 which receives the data applied from the coded block pattern (CBP) and the one-bit left shifter 633. The ninth multiplexer 631 selects one of the received data according to the control command bits D(23~18) and outputs the selected result. If the control command bits D(23,22) are "00" and D(21,20) is "10", the ninth multiplexer 631 supplies the coded block pattern (CBP) value to the third counter 63 when D(19~15) is "O1LCO" and supplies "63" to the third counter 63 when the former is "O1LC1". If the D(19~15) is "11LCx" the output of the one-bit left shifter 633 is supplied to the latch 632. The latch 632 latches the value selected in the ninth multiplexer 631 according to the enable control signal of the enable logic unit 64. The data stored in the latch 632, that is, the 6-bit local count value is supplied to the one-bit left shifter 633 and the condition check logic unit 38.

The one-bit left shifter 633 shifts the input 6-bit local count value by one bit to the left and the shifted data is fedback to the ninth multiplexer 631.

FIG. 3F is a detailed circuit diagram of the effective length output portion 70. The effective length output portion 70 includes a table identification determiner 71 and a place shift determiner 72 which are connected to receive a plurality of data output from the register portion 512 of FIG.

3D. A tenth multiplexer 711 of the table identification determiner 71 selects one of the plurality of data output from the register portion 512 according to the control command bits D(12~9). Here, the control command bits D(12~9) applied to the table identification determiner 71 are for selecting the identification of the VLC table. The data selected by the tenth multiplexer 711 is input to a table unit 712 and a 16-to-4 bit converter 713. The table unit 712 outputs a macroblock type according to a picture coding type of the data selected by the tenth multiplexer 711 and the table identification signal corresponding to the EOB code. Here, there are an I-picture coding type, a P-picture coding type, and a B-picture coding type as the picture coding types. The 16-to-4 bit converter 713 converts the 16-bit input data into the 4-bit data and outputs the converted data as the table identification signal. An eleventh multiplexer 714 receives the table unit 712, the table identification signals output from the 16-to-4 bit converter 713 and the control command bits D(12~9) output from the control command generator 20, and selects one of the received data according to the control command bits D(14~13) and outputs the selected result. The operation of the table identification determiner 71 will be summarized as follows. That is, the table identification determiner 71 does not operate if the D(14~9) is "00xxxx". The table identification determiner 71 outputs the "abcd" as a table identification signal if the D(14~9) is "01abcd", and selects the table identification signal according to the "hwlg" if the D(14~9) is "10hwlg". Also, the table identification determiner 71 selects the table identification signal according to the "regi" if the D(14~9) is "11regi". The table identification signal TABLE_ID output from the table identification determiner 71 is input to the VLC table unit 40.

The place shift determiner 72 includes a twelfth multiplexer 721 which receives the outputs of the register portion 512. The twelfth multiplexer 721 selects one of the received data according to the control command bits C(5~2) of the control command generator 20 and the selected 16-bit data is input to a 16-to-6 bit converter 722. The 16-to-6 bit converter 722 converts the received data from the 16-bit data to the 6-bit data, and outputs the converted result to a thirteenth multiplexer 723. The thirteenth multiplexer 723 receives the output data of the 16-to-6 bit converter 722 and the control command bits C(5~0) and selects one of the received data according to the control command bit C(8). The thirteenth multiplexer 723 selects the control command bits C(5~0) if the C(8) is "0", and selects the output data of the 16-to-6 bit converter 722 if the C(8) is "1". The data selected by the multiplexer 723 is input to a condition shift logic unit 724.

The condition shift logic unit 724 receives the output data of the thirteenth multiplexer 723, the control command bits C(7,6) and the condition signal output from the condition signal generator 30. The condition shift logic unit 724 does not operate if the C(7,6) is "00". If the C(7,6) is "01" the condition shift logic unit 724 outputs the input data supplied from the thirteenth multiplexer 723 to a VLC decoding logic unit 73 irrespective of the value of the condition signal. If the C(7,6) is "10", the condition shift logic unit 724 supplies the output data of the multiplexer 723 to the VLC decoding logic unit 73 when the condition signal "1" and does not operate when the condition signal is "0". If the C(7,6) is "11", the condition shift logic unit 724 supplies the output data of the multiplexer 723 to the VLC decoding logic unit 73 when the condition signal "0" and does not operate when the condition signal is "1".

The VLC decoding logic unit 73 receives the output data of the condition shift logic unit 724 and the VLC length supplied from the VLC table unit 40. The VLC decoding logic unit 73 selects one of the output of the condition shift logic unit 724 and the output of the VLC table unit 40 according to the condition signal output from the condition signal generator 30 and the control command bits C(9~6). The VLC decoding logic unit 73 does not operate if the control command bits C(9,8) is "00", selects the VLC length output from the length ROM 42 if the C(9,8) is "01", and selects the output of the condition shift logic unit 724 if the C(9,8) is "10" or "11". The output data of the VLC decoding logic unit 73 is input to a byte alignment portion 74. The byte alignment portion 74 aligns the output data of the VLC decoding logic unit 73 to meet the standard according to the external enable signal PC_ENABLE and the control command bits D(23~18) of the control command generator and outputs the aligned result. The data output from the byte alignment portion 74 is a place shift value and is used for determining the bits to be output from the barrel shifter. Since the operation of the barrel shifter in connection with the decoding according to the MPEG standard is well known to a person skilled in the art, the detailed description will be omitted.

The above-described syntax parsing control circuit of FIG. 2 determines a place shift value matching the MPEG2 standard, to thereby cause the video decoder which uses the place shift value to decode the input bitstream data accurately.

The above-described embodiment is not limited to the video bitstream data encoded according to the MPEG2 standard. It is apparent to one skilled in the art that the present invention can be modified so that it can be employed in a non-MPEG2 system which requires a syntax parsing to decode the digitally encoded data.

As described above, the high speed syntax parsing control circuit according to the present invention performs a syntax parsing for a video decoder requiring a high speed operating frequency, which can be used in the video decoder for a HDTV.

While only certain embodiments of the invention have been specifically described herein, it will be apparent that numerous modifications may be made thereto without departing from the spirit and scope of the invention.

What is claimed is:

1. A syntax parsing apparatus for a video decoder which decodes encoded bitstream data according to an effective bit length, the syntax parsing apparatus comprising:

an input port for receiving encoded bitstream data;

control command output means for storing data of a plurality of control commands and sequentially selecting and outputting the control command data of each of the plurality of the control commands;

variable-length code table means for selecting and outputting one of the bitstream data received via said input port and a variable-length code corresponding to the received bitstream data according to the control command data supplied from said control command output means, and outputting a variable-length code length corresponding to the received bitstream data;

data store means for storing the selected data output from said variable-length code table means in response to the control command data;

condition signal generation means for generating a condition signal representing whether the bitstream data received via said input port is additional information, using the selected data stored in said data store means and the bitstream data received via said input port; and effective length output means for receiving the selected data stored in said data store means and the variable-length code length output from said variable-length code table means, determining an effective bit length corresponding to next bitstream data to be received via said input port, according to the control command data and the condition signal, and outputting the determined result.

2. The syntax parsing apparatus according to claim 1, wherein said control command output means comprises:

a latch which performs a latching operation with respect to the encoded bitstream data according to an operating clock;

a ROM table unit for storing said plurality of control command data and outputting the corresponding control command data as an address of the output of said latch; and an adder for increasing the output of said latch by "1" and feeding back the increased result to said latch.

3. The syntax parsing apparatus according to claim 2, wherein said ROM table unit stores the plurality of control command data for processing a subroutine according to a syntax in a particular region, and wherein said control command output means comprises:

a selector which receives a jump address among the control command data output from said ROM table unit and the output of said adder and selects one of the jump address and the output of said adder according to an increase/jump select signal and the condition signal supplied from said condition signal generation means;

a subroutine processor which stores the output of said adder as a return address, generates a select signal using the control command data output from said ROM table unit, and selects and outputs one of a predetermined subroutine start address and the stored return address according to the control command data output from said ROM table unit; and a multiplexer for selecting one of the data selected and output from said subroutine processor and the output of said selector and outputting the selected result to said latch.

4. The syntax parsing apparatus according to claim 3, wherein said multiplexer supplies the data selected and output from said subroutine processor to said latch when the select signal generated in said subroutine processor indicates a subroutine start and supplies said return address to said latch when the generated select signal indicates a subroutine completion.

5. The syntax parsing apparatus according to claim 1, wherein said variable length table means comprises:

a code ROM for storing variable length codes and outputting the variable length code determined by the bitstream data received via said input port;

a length ROM for storing the variable length code lengths corresponding to said variable length codes, and outputting the variable length code length determined by said bitstream data received via said input port to said effective length output means; and a multiplexer for selecting one of the bitstream data received via said input port and the corresponding variable length code according to the control command input from said control means and outputting the selected result to said data store means.

6. The syntax parsing apparatus according to claim 5, wherein said code ROM stores the variable length codes relating to the plurality of variable length code tables and said length ROM stores the variable length code lengths relating to the plurality of variable length tables.

7. The syntax parsing apparatus according to claim 6, wherein said effective length output means comprises a table identification signal generator which generates a table identification signal matching the data received from said data store means and responds to the control command data to supply the generated table identification signal to said code ROM and said length ROM, in which said table identification signal indicates a particular one of the plurality of the variable length code tables.

8. The syntax parsing apparatus according to claim 1, wherein said condition signal generation means comprises:

comparator means for respectively comparing a plurality of fixed values relating to additional information with corresponding units of the bitstream data received via said input port, and outputting the comparison results;

a local hardware logic unit for receiving the data stored in said data store means, and outputting a frame offset value if the received data indicates a repeat loop in the syntax and outputting a local hardware logic value if the received data indicates the other additional information;

a counter portion for individually counting the frame offset values from said local hardware logic unit and the fixed counter values which respectively match other repeat loops, and outputting the count values; and a signal generator for receiving the comparison results of said comparator means, and the count values and generating a condition signal by logically operating the received data according to a predetermined combinational logic using the control command data.

9. The syntax parsing apparatus according to claim 8, wherein said counter portion comprises:

a first counter for down-counting the frame offset value according to said control command data;

a second counter for down-counting the fixed count value matching one repeat loop according to the control command data; and a third counter for selecting one of a code block pattern value and the fixed count value corresponding to the respective other repeat loop according to the control command data and performing a one-bit left shift operation with respect to the data selected by said third counter.

10. The syntax parsing apparatus according to claim 8, wherein said signal generator comprises:

a first multiplexer for selecting and outputting the data output from said data store means according to the control command data;

a second multiplexer for selecting and outputting the local hardware logic value output from said local hardware logic unit according to the control command data; and a zero checker for checking whether the output of said first multiplexer is "0".

11. The syntax parsing apparatus according to claim 1, wherein said effective length output means comprises:

a place shift determiner for receiving the data output from said data store means, the control command data and the condition signal, shifting a place of the data output from said data store means using the data output from said data store means, the control command data and the condition signal, and selectively outputting the place-shifted data; and a variable length decoding logic unit for receiving the variable length code length output from said variable length code table and the place-shifted data, and selecting and outputting one of the variable length code length and the place-shifted data as an effective bit length according to the condition signal and the control command data.

12. The syntax parsing apparatus according to claim 11, wherein said variable length decoding logic unit selects the variable length code length output from said variable length code table unit when the bitstream data received via said input port is the encoded data, and selecting the output data of said place shift determiner when the received bitstream data is additional information.

* * * * *